United States Patent [19]

Rhodes, Jr. et al.

[11] Patent Number: 5,183,693
[45] Date of Patent: Feb. 2, 1993

[54] MOLD METHOD AND APPARATUS FOR STABILIZING THE LOCATION OF A SKIN INSERT

[75] Inventors: Richard D. Rhodes, Jr., Somersworth; W. David Fredericks, Brookfield, both of N.H.

[73] Assignee: Davidson Textron Inc., Dover, N.H.

[21] Appl. No.: 660,044

[22] Filed: Feb. 25, 1991

Related U.S. Application Data

[62] Division of Ser. No. 420,382, Oct. 12, 1989, Pat. No. 5,006,288.

[51] Int. Cl.$^5$ ............... B29C 33/14; B29C 39/10; B32B 3/30
[52] U.S. Cl. .................................. 428/34.1; 428/99; 428/157; 428/158; 428/159; 264/46.6; 264/46.8; 425/117; 425/111; 425/DIG. 48; 249/94
[58] Field of Search ............... 428/34.1, 99, 157, 158, 428/159; 425/DIG. 33, 117, 111, DIG. 48; 264/46.4, 46.6, 46.7, 46.8, 46.5, 16; 249/95, 83, 171, 93, 94

[56] References Cited

U.S. PATENT DOCUMENTS

| 4,195,046 | 3/1980 | Kesling | 264/16 |
| 4,465,710 | 8/1984 | Uchiyama et al. | 264/46.5 |
| 4,544,126 | 10/1985 | Melchert | 249/171 |
| 4,608,744 | 9/1986 | Nemoto | 425/DIG. 33 |
| 4,639,386 | 1/1987 | Akao | 428/36.92 |
| 4,653,718 | 3/1987 | Dickens | 249/95 |
| 4,673,542 | 6/1987 | Wigner et al. | 264/46.7 |
| 4,786,447 | 11/1988 | Kouda | 264/46.6 |
| 4,824,070 | 4/1989 | Mizuno | 264/46.4 |
| 4,836,495 | 6/1989 | McCormack | 249/83 |
| 4,844,853 | 7/1989 | Ito | 425/DIG. 33 |
| 4,938,825 | 7/1990 | MacDonald | 264/46.8 |
| 4,946,727 | 8/1990 | Kessler | 428/99 |
| 4,973,234 | 11/1990 | Swenson | 264/46.8 |

FOREIGN PATENT DOCUMENTS 58-173616 7/1983 Japan.

Primary Examiner—Ellis P. Robinson
Assistant Examiner—Rena Dye
Attorney, Agent, or Firm—Reising, Ethington, Barnard, Perry & Milton

[57] ABSTRACT

A skin or shell is disclosed for use in a mold process in which the skin or shell is placed in a mold in which foam precursors are directed onto the skin for reaction thereagainst to form a foam layer thereon; the skin includes integral connector features thereon adapted to be connected to the mold for stabilizing the location of the skin within the mold so as to prevent wrinkling of the skin during the mold process. Apparatus for stabilizing the location of the skin or shell in a mold cavity part includes recesses formed on the mold adapted to be interconnected with the integral skin connector features for producing the desired stabilization and a method is described which includes the steps of preforming a skin from dry cast thermoplastic or liquid plastisol material to have integral connector features thereon; providing a mold with recesses therein engageable with the cast integral connector features for producing the desired stabilization; closing the mold and foaming the shell to form a foam pad on the backside of the shell.

3 Claims, 3 Drawing Sheets

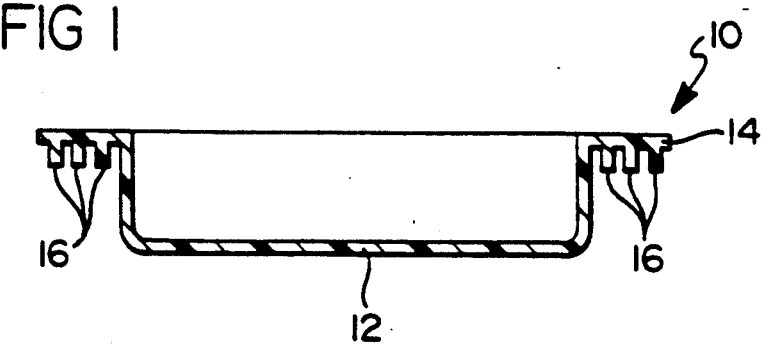
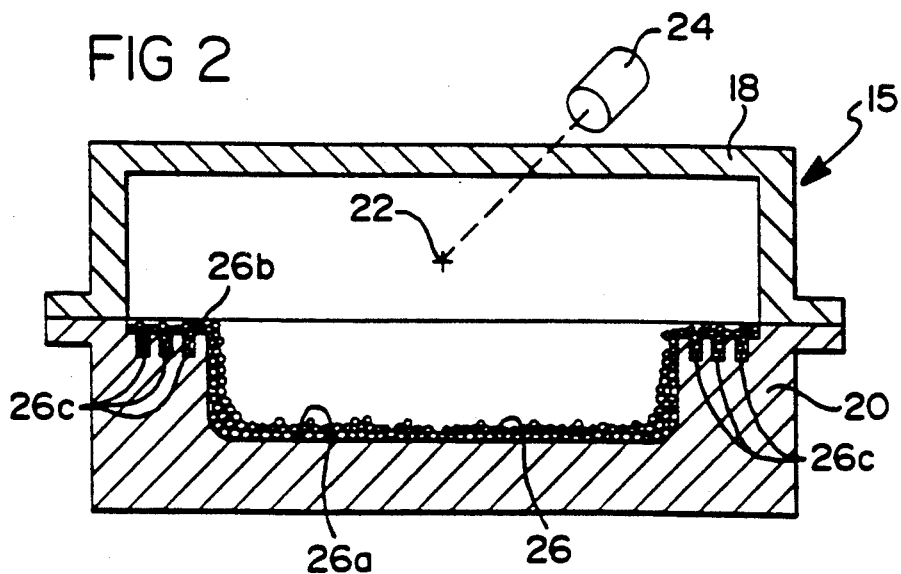
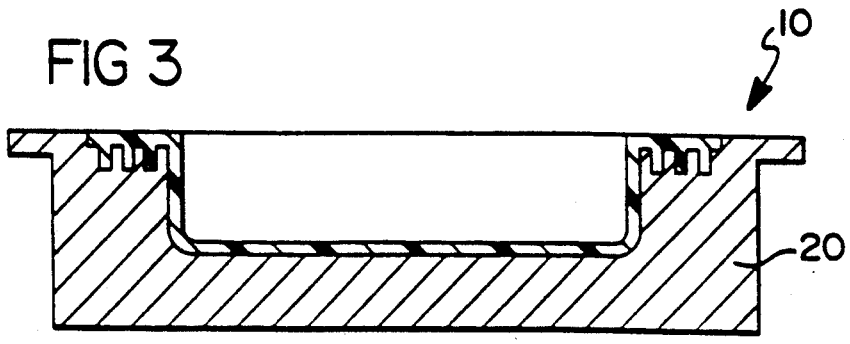

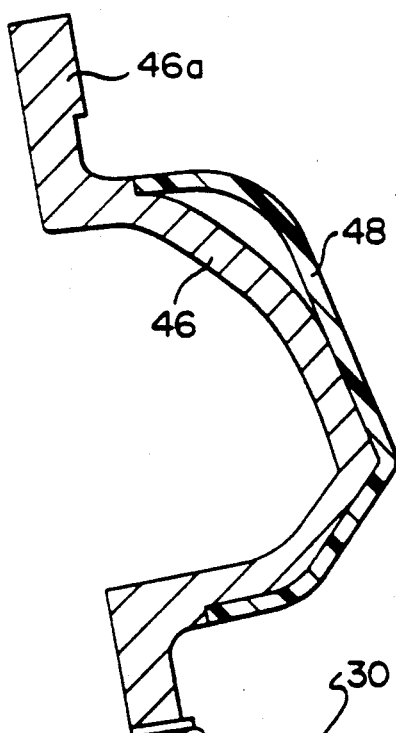
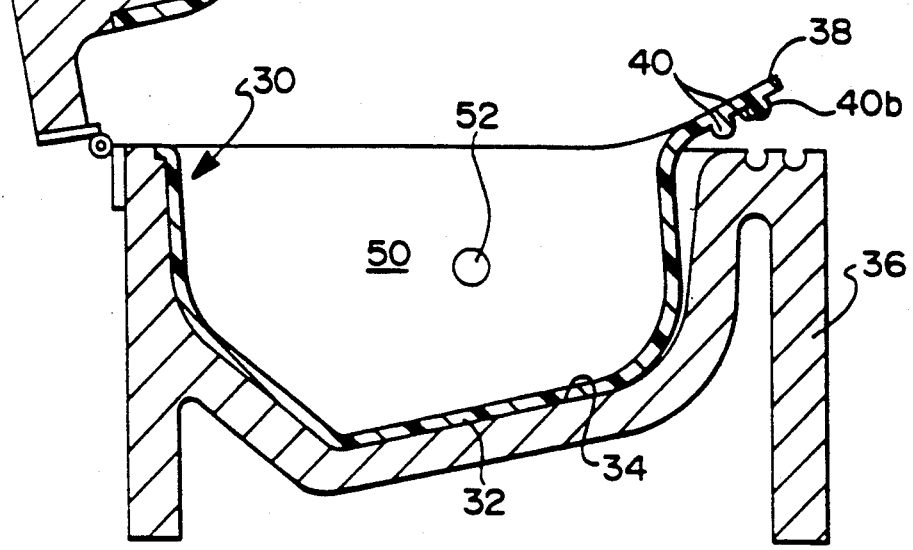
FIG 4
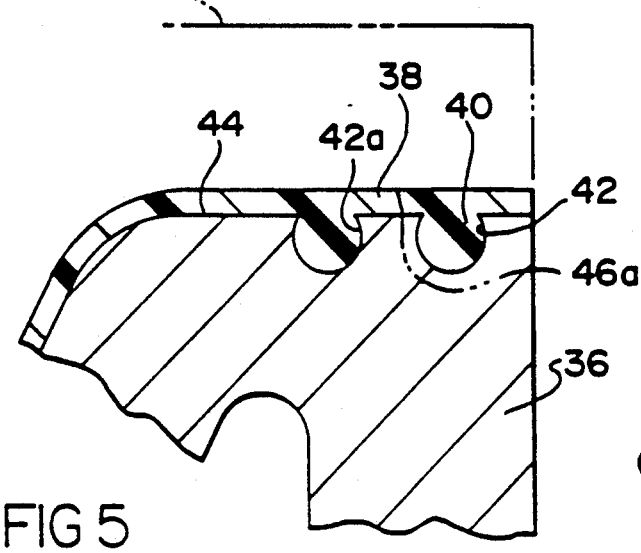
FIG 5
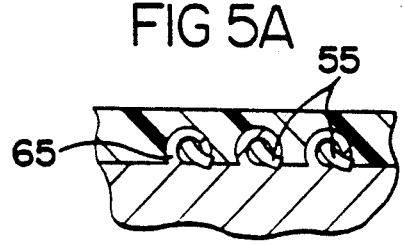
FIG 5A

MOLD METHOD AND APPARATUS FOR STABILIZING THE LOCATION OF A SKIN INSERT

This is a division of application Ser. No. 420,382, filed on Oct. 12, 1989, now U.S. Pat. No. 5,006,288.

FIELD OF THE INVENTION

This invention relates to methods and apparatus for forming a composite plastic product including an outer shell and a layer of plastic foam bonded to the outer shell and more particularly to such methods and apparatus in which the outer shell is stabilized within the mold prior to foaming in order to prevent wrinkling of the outer shell during the mold process.

BACKGROUND ART

U.S. Pat. No. 4,793,793 discloses a method and apparatus for foaming a shell component. The shell component is inserted into a cavity mold and is held in place therein by providing a plurality of vacuum ports in the cavity mold which, when activated will draw the shell component against the cavity mold.

U.S. Pat. No. 4,260,576 discloses a mold apparatus that has a holding pin for connecting a metal top of a ski in a mold for molding a fiberglass epoxy resin to the metal top.

U.S. Pat. No. 4,115,170 discloses a foam mold having strips interposed between cover sheets for fastening the cover sheets within a mold apparatus.

U.S. Pat. No. 4,116,736 discloses mold apparatus having clamps for securing an elastic membrane to the periphery of the mold.

U.S. Pat. No. 4,195,046 discloses a magnet in a mold apparatus for locating an insert therein with respect to mold halves utilized in the molding process.

U.S. Pat. No. 4,673,542 discloses a method for molding a hook and loop type fastener strip in a seat cushion. The mold apparatus includes a separate steel plate and a magnet in the mold member for securing the hook and loop fastener in place on the mold prior to foaming the seat.

One problem in prior art arrangements for retaining a skin or insert in a mold is that the mold apparatus includes separate fixture parts such as pins, magnets or clamps that require separate manipulation to connect the skin or insert on the mold apparatus for retaining it in place thereon.

In the manufacture of many composite products, a flexible skin or shell component is placed in the mold prior to directing foam precursors into the mold for forming a foam layer against the back of the skin layer. Currently, vinyl skins are held in place in a pour mold member by use of masking tape or vacuum as set forth in the above-identified -793 patent. However, in certain cases where the skin is thick or the retainers have variable dimensions, the skin can be pulled into the cavity when the mold closes to cause wrinkles to develop in the skin. Such wrinkles are retained in the final composite product once the foam layer is molded against the back side of the wrinkled skin. Such products must be scrapped. In the case of products such as instrument panels or other automotive interior products, the cost of such scrap material can be substantial.

SUMMARY OF THE INVENTION

In order to solve the problem of uncontrolled wrinkles which can result in scrap material of such composite products, it is an object of the present invention to provide a connector system that eliminates the need for vacuum hold down devices in mold apparatus and which further eliminates the need for separate fastening fixtures that must be manipulated with respect to a flexible skin or shell component to hold it in a mold.

Another feature of the present invention is to provide for elimination of wrinkles in a skin or shell cover of a foamed product by the provision of a skin having connector features formed integrally thereon for connection to a mold so as to prevent the shell from being separated from the mold when the mold is closed in preparation for forming a foamed layer against the back side of the skin once retained in the mold.

A further feature of the present invention is to provide a vinyl skin or shell for forming the outer surface of a mold composite foam product and wherein the vinyl shell includes a first surface portion conformable to the surface of a mold and a second surface portion which is locatable over the perimeter portions of the mold and wherein the second surface portion includes means integrally formed thereon for forming a locking member engageable with the pour mold to prevent the shell from being drawn into the mold cavity thereby to prevent wrinkling of the outer surface of a composite foam product and resultant scrapping of a defective product.

Another feature of the present invention is to provide a vinyl skin or shell as set forth in the preceding paragraph wherein the connector means is formed either as a plurality of integral pins, integral knobs, or integral hooks or loops on the shell at a point for connection to mold recesses for securing the vinyl shell in place without wrinkling of an outer surface of the composite foam product produced by the molding process.

Still another object of the present invention is to provide pour mold apparatus for forming a composite foam product including a mold cavity or mold part having a peripheral edge and a mold surface adapted to receive and support a shell component forming the outer surface of a composite foamed product; and further including a lid for closing the mold and wherein the mold cavity has means forming connector recesses thereon engageable with an integral portion of a shell component for stabilizing the location of the shell within the mold cavity to prevent lid closure from wrinkling the outer surface of a composite foam product made in the mold apparatus.

Still another feature of the present invention is the provision of a process for molding a composite part by placing a shell insert on a mold cavity part and thereafter directing foam precursors against the supported insert and reacting them thereagainst to form a layer of foam bonded thereto wherein the process is characterized by precasting a shell of thermoformable plastic material to have a first portion thereon adapted to be smoothly supported by the mold cavity part and to form a plurality of connection features in a second surface portion of the shell at the periphery thereof; providing a mold cavity with a surface thereon for smoothly supporting the first surface portion and shaping the mold cavity part to have recesses therein adapted to engage the integral connection features of the second surface portion for stabilizing the position of the shell within the mold cavity part so as to prevent it from being separated from the mold cavity part and wrinkled during the molding process.

These and other features and advantages and objects of the invention will be more apparent when taken in conjunction with the following detailed description of the invention along with reference to the accompanying drawings.

BRIEF DESCRIPTION OF THE DRAWINGS

FIG. 1 is a cross-sectional view of a shell component of a composite plastic product including the present invention;

FIG. 2 is a diagrammatic view of a closed powder casting system for rotation molding of the article shown in FIG. 1;

FIG. 3 is a diagrammatic view of the product of FIG. 1 as formed in a heated mold component of the apparatus of FIG. 2;

FIG. 4 is a cross-sectional view of a mold apparatus including another shell insert embodiment in the pour mold apparatus of the present invention;

FIG. 5 is an enlarged fragmentary sectional view of a shell component interconnected to the mold apparatus of FIG. 4; FIG. 5A is an enlarged fragmentary sectional view of another embodiment.

DETAILED DESCRIPTION OF THE PREFERRED EMBODIMENTS

Referring now to FIG. 1, a flexible shell or skin component 10 of thermoplastic material is illustrated. It includes a first portion 12 that is adapted to be connected in a pour mold apparatus to be described. It further includes a second peripheral portion 14 having a plurality of integrally formed connector pins 16 formed thereon that are adapted to be connected to connecting recesses on a pour mold apparatus as described below.

Figure 6:
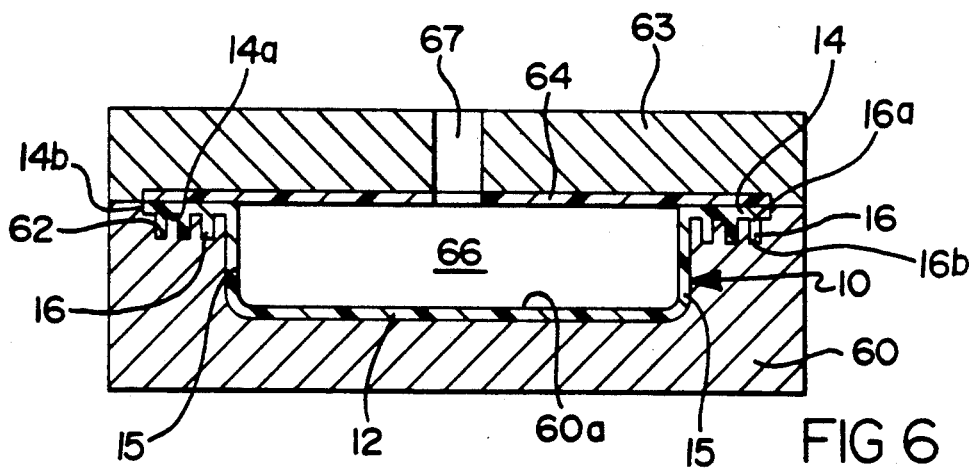
FIGS. 6–9 disclose the process of the present invention for forming a wrinkle free shell component on a composite foam product.

The connector pins 16 constitute a plurality of integrally formed retention means formed substantially perpendicular to the surface 14a of the peripheral portion 14. The pins 16 each have a root segment 16a joined to the outer surface 14a. Each of the pins 16 further include a distal end 16b spaced outwardly of the outer surface 14a adjacent the edge 14b of the peripheral portion 14. As shown in FIG. 6, the peripheral portion 14 is joined to the first portion 12 by a transition portion 15.

In accordance with one aspect of the present invention, the shell 10 is cast from granules or powder particles of thermoplastic material such as a plastic resin having suitable plasticizers therein and including pigmentation to form pigmented thermoplastic particles that will fuse together during a rotary casting process. Powder casting apparatus 15 includes a powder box 18, which is connected to a heated mold 20 to form a sealed system. The apparatus 15 is rotated about an axis 22 by suitable means such as a drive motor 24. Thermoplastic powder from the box 18 is cast against a heated surface 26 of the heated mold 20. The heated surface 26 includes a first planar portion 26a and a second peripheral portion 26b having recesses 26c formed therein into which powder particles are collected and fused to form the connector pins 16. The resultant flexible skin or shell 10 formed by the rotary casting process apparatus 16 is shown in FIG. 3 prior to separation from the mold 20 after it is cooled.

Referring now to FIG. 4, a second embodiment of a skin or shell is illustrated at 30. It includes a first portion 32 supported on a surface 34 of a mold 36 constituting a depressed skin support surface. The shell or skin 30 includes a second peripheral portion 38 having a plurality of integrally formed knobs 40 thereon at select points along the periphery of the shell 30. The knobs 40 are interlocked in a cavity 42 on the pour mold 36 at an outer peripheral surface 44 thereon that constitutes a raised outer peripheral surface on the mold 36. Each of the cavities 42 includes a narrow neck portion 42a that will interlock against an undercut surface 40b on each of the knobs 40 for securely connecting the shell portion 38 securely with respect to the mold 36. The connector serves to prevent the shell 30 from separating from the mold 36 as a mold lid 46 of the mold is moved from the open position in FIG. 4 into a closed position where a surface 46a of the lid is located in overlying relationship with the shell portion 38 as shown in broken lines at 46b in FIG. 5. In the illustrated arrangement, the lid 46 carries a load bearing plastic preform or insert 48. When the lid is closed, a space 50 is formed between the insert 48 and the shell 34 and foam precursors are directed through an inlet 52 into the space 50 for reaction therein when the lid 46 is closed to form a layer of foam material bonded to both the shell 32 and the insert 48. Alternatively, the foam precursors can be poured into the mold 36 prior to lid closure. Another embodiment of the invention has other hooks 55 or loops 65 formed on either a portion of a shell or on a mold as shown in FIG. 5A to form the interconnection.

Figure 7:
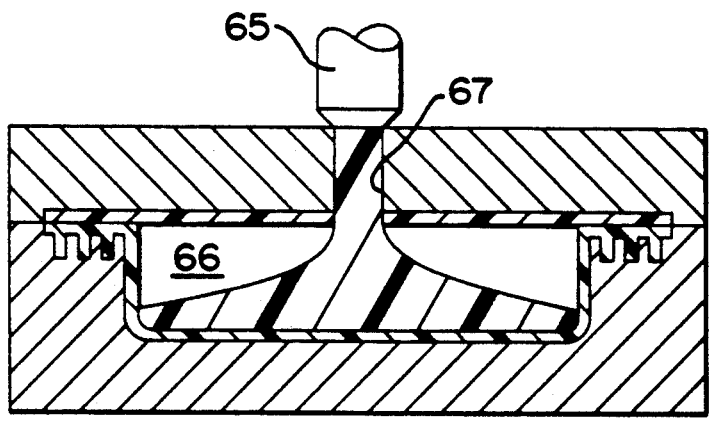
Figure 8:
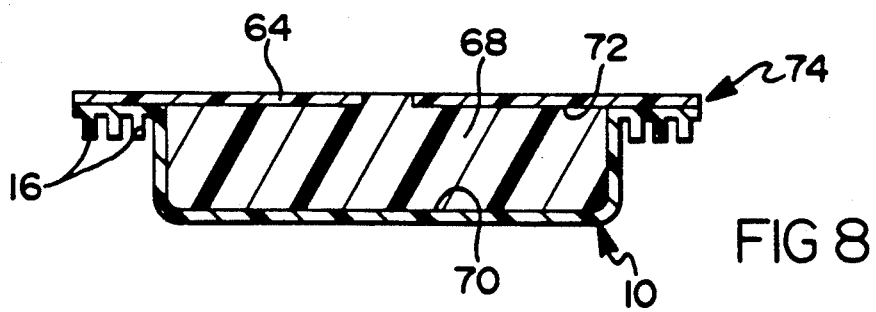
Figure 9:
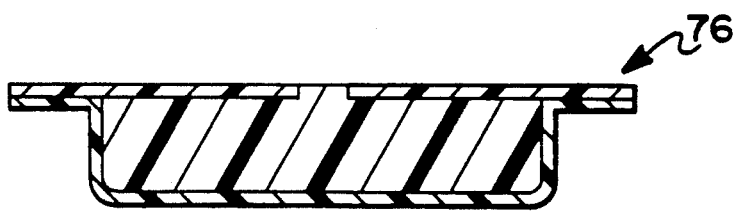

Referring more particularly to FIGS. 6–9, the process of the present invention includes precasting a thermoplastic shell component 10 having integral connector pins 16 thereon. The precast thermoplastic shell 10 is then supported in a pour mold 60 having recesses 62 formed therein corresponding to the connector pins 16 for forming an interlocking connection which positions the shell 10 against wrinkling with respect to the mold 60. In particular, the interconnection between the pin 16 and the recesses 62 will locate a first portion 12 of the shell 10 in full supported relationship with a surface 60a of the mold 60. Thus, when a lid 63 carrying an insert 64 is closed with respect to the mold 60, the shell 10 will be securely held in place for stabilizing its position within the mold cavity part represented by the pour mold 60 so as to prevent the shell from being wrinkled with respect to the mold 60 during the subsequent molding process. As shown in FIG. 7, the process includes directing foam precursors through a nozzle 65 and a pour opening 67 into a mold cavity 66 where the material is reacted to form a layer of foam 68 bonded to the inner surface 70 of the shell 10 and to the inboard surface 72 of the insert 64. A resultant composite foam plastic product 74 shown in FIG. 8 with interconnecting pins 16. The pins 16 are then removed by suitable means to form a resultant finished product 76 as shown in FIG. 9.

In each of the above-described systems, mold release agents can be present on the mold. The above-described inventions, however, are not affected by their use.

While the composite product is representatively illustrated as an interior trim product such as an armrest or an instrument panel, it should be understood that the process is equally suited for use in other products such as luggage, plumbing products or building products requiring a smooth unwrinkled outer surface appearance and a padded feel.

While the invention has been particularly shown and described with respect to preferred embodiments, it will be understood by those skilled in the art that various changes in form and detail may be made without departing from the spirit and scope of the invention, which is encompassed within the following claims.

What is claimed is:

1. A flexible thermoplastic mold skin insert forming the outer surface of a composite plastic article formed in a foaming mold; said foaming mold having a cavity portion with a raised outer peripheral surface with recessed openings therein and the mold cavity portion further including a depressed skin support surface located beneath the raised outer peripheral surface and wherein the skin insert is supportable on said cavity portion in a stabilized location thereon;

said skin insert having a peripheral edge portion thereon conformable to said raised outer peripheral surface; said skin insert having a first surface engageable with said cavity portion at both said raised outer peripheral surface and said depressed skin support surface and said skin insert further having a second surface adapted to be covered by form material within said foaming mold;

said skin insert having a plurality of integrally foamed retention means formed substantially perpendicular to said first surface at said peripheral edge; said retention means including a root segment joined to said first surface thereof and having a distal end spaced outwardly of said first surface only at said peripheral edge; said integrally formed retention means engageable with said recessed openings for retaining said skin insert within said cavity portion;

said skin insert having an inner portion thereon depressed with respect to said peripheral edge portion; said inner portion conformable to said cavity portion inboard of said raised outer peripheral surface and further including a transition portion joining said inner portion to said peripheral edge to provide for wrinkle free positioning of said inner portion and said transition portion on said mold cavity part and said integrally formed retention means adapted to interlock within said recessed openings to maintain said inner portion and said transition portion wrinkle free during foaming of the composite part.

2. The skin insert of claim 1 further characterized by said integrally formed connector means being formed as a plurality of knobs to stabilize the location of the skin insert within the mold cavity portion.

3. The skin insert of claim 1 characterized by said integrally formed connector means being formed as a plurality of hooks for stabilizing the location of the skin insert within the mold cavity portion.

* * * * *